Aug. 18, 1931.  A. MOHR  1,819,655
APPARATUS FOR INDICATING THE LEVEL OF LIQUIDS
Filed June 25, 1928   2 Sheets-Sheet 2
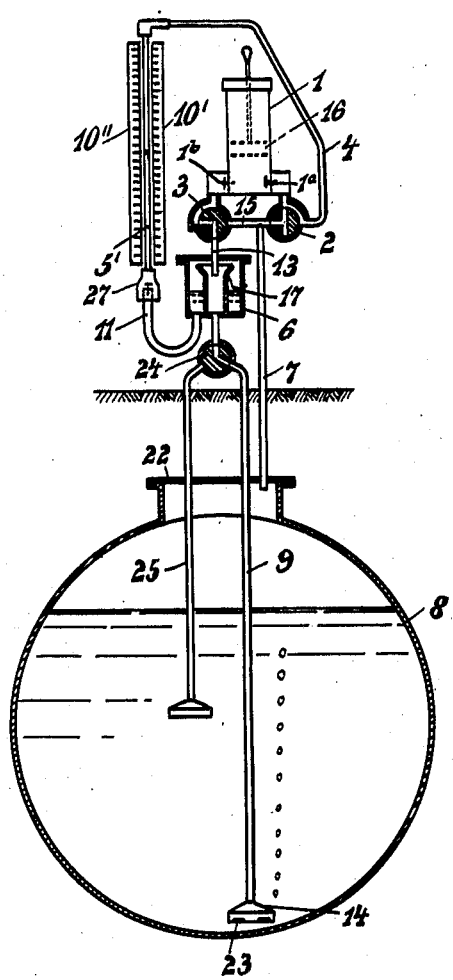
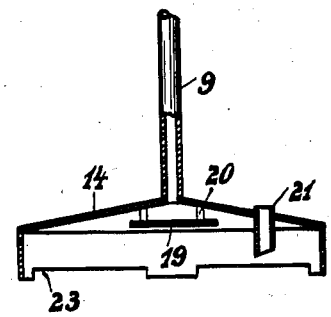
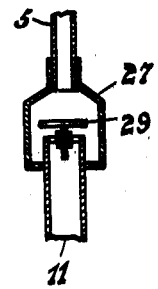
Inventor:
A. Mohr
By his Attorney Patented Aug. 18, 1931

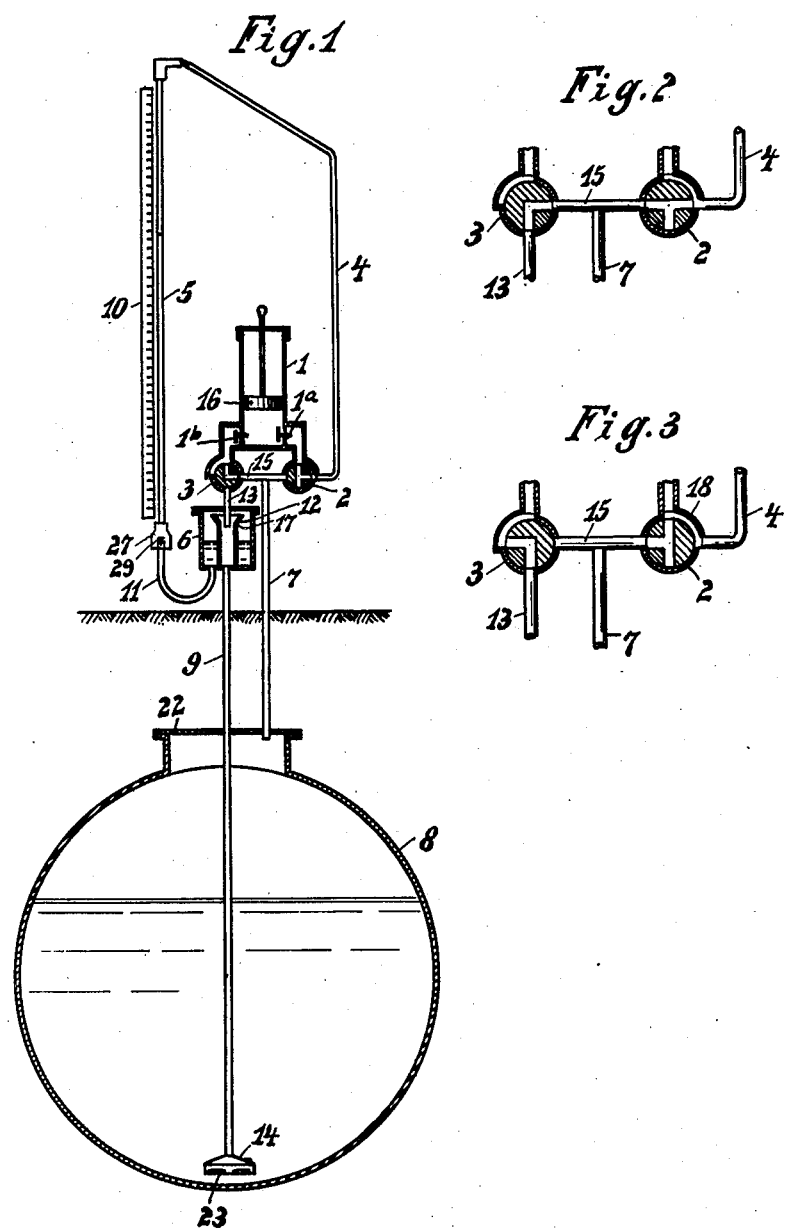

1,819,655

UNITED STATES PATENT OFFICE

ARNOLD MOHR, OF BERLIN, GERMANY, ASSIGNOR TO GESELLSCHAFT FUR MESS-UND FULL-APPARATE M. B. H., OF BERLIN, GERMANY

APPARATUS FOR INDICATING THE LEVEL OF LIQUIDS

Application filed June 25, 1928, Serial No. 288,026, and in Germany September 23, 1925.

This invention relates to a means for indicating the levels of liquids, which are contained in a tank situated at any desired elevation lower than the point at which the indicator is mounted.

More particularly the invention relates to a level indicator for inflammable liquids stored underground.

The main object of the invention is to provide an arrangement wherein on each occasion when measurement is taken exactly the same liquid, or mixture of liquids, and exactly the same pressure as in the storage tank or reservoir exists in the level indicator (which is furnished with a measuring device), so that upon each occasion of measurement the specific weight of the liquid in the tank or reservoir and in the measuring device is essentially the same. Inexactitudes in measurement are thus avoided which occur in the case of the hitherto known indicators by reason of the fact that the liquid in the tank and that in the measuring device are different to each other and possess different specific weights.

An additional advantage in connection with the invention resides in the fact that readings in respect of any kind of liquid which may be filled into the tank may be taken on the one scale.

The level indicator may be quite independent of the tapping arrangement for the tank, although if desired the same may also be connected therewith in such manner as to enable the connecting pipes, at least for the greater part, to be used in common for both arrangements, thus simplifying the general construction.

The invention will now be described more fully with reference to the accompanying drawings, which show two forms of embodiment by way of example.

Fig. 1 shows in diagrammatical form a level indicator with the storage tank or reservoir and the appertaining pipes, Figs. 2 and 3 illustrate two different positions of valves or cocks during the measuring operation, Fig. 4 shows a somewhat modified form of level indicator with tank and pipes, Figure 5 is a detail view in section of a part of the connection means of the measuring means with the tank; and Figure 6 is a sectional detail view of the connection of a view glass of the indicating means with the measuring means.

Referring now to the drawings, the level indicator comprises in the main a view glass 5 with indicating scale 10, arranged in relation thereto, a receptacle or chamber 6, a pipe 9 immersed at the one end and leading to the tank 8, and a suction and pressure pump 1. The pump 1, having a check valve controlled suction inlet 1a and a check valve controlled outlet 1b, on the suction side is connected by means of the pipe 4 with the view glass 5, and by means of the pipe 7 with the air or gas space of the tank 8, which is closed by means of the cover 22. The pressure side of the pump 1 is connected by means of the pipe 13 with the chamber 6, the latter at the bottom communicating via the pipe 11 with the view glass 5. The pipe 9 leads from the air space at the upper end of the chamber 6 almost to the bottom of the tank 8, and is furnished at the end with a bell 14. In the pipe 7, 4 is provided a cock 2, and in the pipe 13 a cock 3, from which a connection pipe 15 branches off to the pipe 7.

Assuming measurement is to be effected it is necessary in the first place to expel from the view glass 5 the liquid remaining therein from the occasion of a previous measurement. For this purpose the cocks 2 and 3 are moved into the position shown in Fig. 1, and the hand pump 1 is set into operation. The pump 1 then sucks up through the pipe 4 the liquid contained in the view glass 5 and the chamber 6, and upon the downward movement of the plunger 16 forces the same through the cock 3 and the pipe 7 into the tank 8. Immediately the vacuum resulting in the chamber 6 assumes a sufficient degree, the liquid in the tank 8 mounts through the pipe 9 and flows into the chamber 6, rises in the view glass 5 and finally passes into the pipe 4. It having been established that the view glass has been entirely filled, the pumping operation is stopped, and the cocks 2 and 3 are moved into the position shown in Fig. 2. In this manner any liquid which may be in the pipe 4 will flow off towards the tank 8, and the space above the liquid in the view glass 5 and also the air space in the chamber 6 is made to communicate through the pipes 4, 7 and 13 with the gas or air space of the tank 8. Since in this case the air or gas pressure in the tank rests through the medium of the pipe 4 on the column of liquid in the view glass, and through the medium of the pipe 13 on the liquid in the chamber 6, the column of liquid in the view glass 5 falls due to gravity, the air or gas pressure being constant at both ends of the column of liquid in the view glass. This liquid is received by the chamber 6 through the pipe 11 by passing over a baffle plate in the form of a disk 29 mounted in spaced relation to the entrance of the pipe 11 at the juncture of the view glass 5 with the pipe 11 to restrict the flow of liquid from the view glass to the chamber 6 preventing surging of the liquid therein, and the disk is adjustable to vary the flow of liquids of different consistencies. An amount of liquid remains in the pipe 11 and view glass to a level even with the liquid level in the chamber, the superfluous amount flowing back through the pipe 9 into the tank 8. The upper mouth of the pipe 9 is surrounded by a skirt 12, which at the mouth of the pipe 9 possesses one or more restricted holes 17, in order that upon a surging or wave-like motion of the surface of the liquid in the chamber 6 not a too great amount of liquid will flow off through the pipe 9 during the falling of the liquid in the view glass 5, but only such amount that, as soon as the motion in the chamber 6 again ceases, the liquid reaches the entrance to the pipe 9. The liquid in the chamber 6 is the measuring liquid and when the level thereof is even with the holes 17, the chamber contains a sufficient quantity of liquid to fill the view glass to obtain a correct reading of the liquid level in the tank 8, should the tank be full. The filling of the view glass with the liquid from the tank 8 through pipe 9 and chamber 6 assures the refilling of the chamber 6 to the proper level upon the entrance of the tank pressure to the pipe 4 and above the liquid in the view glass.

The chamber 6 is now filled with the liquid from the tank, and above the column of liquid in the view glass 5 and the liquid in the chamber 6 exactly the same air pressure prevails as in the tank 8, so that in the pipe 9 the liquid has exactly the same level as in the tank.

If measurement of the contents of the tank 8 is to be performed, the cocks 2 and 3 are moved into the position according to Fig. 3, and the pump 1 is set into operation, the plunger 16, through the cock 2 and the pipe 7, then sucking air or gas out of the tank 8 and forcing the same through the cock 3 and the pipe 13 into the chamber 6. The pressure created therein causes on the one hand the liquid in the chamber 6 to be raised in the view glass 5, and on the other hand the column of liquid in the pipe 9 to be forced downwards. The rising of the liquid in the view glass 5 is not obstructed by the air contained in the latter and in the pipe 4, as this air is able to slowly escape through the fine boring 18 in the cock 2 towards the pump 1. As soon as the pressure in the chamber 6 has assumed such dimensions that by means of the same the whole of the liquid has been forced out of the pipe 9 towards the bottom, air or gas will pass out of the lower end of the pipe 9 and rise to the top in the form of bubbles in the tank 8. As soon as air or gas commences to escape out of the end of the pipe 9 a further mounting of the column of liquid in the view glass 5 is unable to occur, as the pressure in the chamber 6 then remains constant, even should the pumping operation be continued. The pressure created in the chamber 6 by the pump 1 conforms with the weight of the column of liquid expelled from the pipe 9, i. e., the level of the liquid in the tank 8. Since the rising of the column of liquid in the view glass 5 is also dependent on the pressure in the chamber 6, the top of the liquid in the view glass 5 indicates the height of the column of liquid expelled from the pipe 9, and accordingly the level of the liquid in the tank 8.

Immediately such pressure has been reached in the chamber 6 as conforms with the column of liquid in the pipe 9, the liquid in the view glass 5 remains stationary, and pumping is then stopped.

If liquid is withdrawn from the tank at a tapping point, which is not shown in the drawings and may be of any desired construction, the liquid falls in the tank 8, and accordingly the air also escapes out of the chamber 6 through the pipe 9, whereby the pressure in the chamber 6 sinks in exactly the same ratio as liquid is withdrawn from the tank 8. Upon the drop in pressure in the chamber 6 the liquid in the view glass 5 also falls to the same extent. It can accordingly be read from the scale 10, which is provided at the side of the view glass, exactly by what amount the level of the liquid has dropped in the tank 8. The scale 10 is graduated exactly in accordance with the volume of the tank 8, so that direct indication is given by the scale as to the number of gallons withdrawn.

When the measurement is being performed, a pressure of such extent, as described above, is generated in the chamber 6 by the pump 1 that the liquid is forced out of the bottom of the pipe 9. Now since upon the refilling of the view glass, or chamber 6 respectively, the liquid mounts in the pipe 9 it may readily occur, particularly if the pipe 9 is long and is not disposed vertically, but inclinedly, and is also possibly bent at one or more points, that an amount of liquid, which is relatively large in its entirety, remains adhering to the inner wall of the pipe 9 in the form of a thin layer or film, this liquid slowly moving downwards. It must be avoided that this liquid forms into drops of any appreciable size at the lower end of the narrow pipe 9, as the same under the action of the pressure prevailing in the pipe 9 and under their own weight would have the tendency to pass out of the pipe 9, thus causing sudden fluctuations in the pressure in the pipe 9 and also fluctuations in the level of the liquid in the view glass 5. To avoid these fluctuations the lower end of the pipe 9 is accordingly constructed to open out into a bell-like enlargement 14 (Fig. 5). This enlargement renders the formation of large drops impossible, as the downwardly flowing film of liquid becomes distributed over the relatively large area of liquid within the bell 14. Within the bell 14, directly below the mouth of the pipe 9, is provided on ribs 20 a catch plate 19, in order when the liquid is forced out of the pipe 9 to prevent waves of any size being formed in the tank 8. In the upper wall of the bell 14 is provided an opening, in which is fitted a small vertical aeration tube 21. Through this tube 21 the air is able to escape out of the bell in the form of small bubbles immediately the pressure in the pipe 9 has attained such dimensions that the liquid in the pipe 9 and bell 14 is so low that the level of the liquid only reaches to the lower edge of the tube 21. The lower edge of the bell 14 is cut away at 23, so that should the bell 14 possibly contact with the bottom of the tank 8, the liquid is nevertheless able to pass without obstruction out of the tank into the bell and vice versa.

If the tank 8 has a very large diameter, or should the same be situated vertically, the view glass 5 and the measuring scale 10 would normally also require to be relatively long, the same, in the form of embodiment according to Fig. 1, conforming approximately in length with the diameter of the tank. To avoid this a cock 24 may be fitted in the pipe 9, from which cock a branch pipe 25 passes to the tank 8, as illustrated in Fig. 4. Whilst the pipe 9 leads practically to the bottom of the tank, the pipe 25 terminates at approximately half the height thereof. The cock 24 is a three-way cock of the usual construction, which in accordance with its position connects the chamber 6 with the pipe 9 or with the pipe 25. The view glass 5' is merely half the length of the glass 5, as shown in Fig. 1. In the case of this embodiment two scales 10' and 10" are provided in place of the scale 10. All remaining parts of the indicator according to Fig. 4 exactly conform with the similar parts bearing the same reference character in Fig. 1.

The scale 10" forms an extension of the scale 10'. If the contents of the tank 8 are to be measured, the chamber 6 and the view glass 5' are first filled with liquid from the tank 8 in the manner described above, the liquid passing through the pipe 9 and the cock 24 to the chamber 6. The cocks 2 and 3 are then manipulated exactly in the manner as described above in connection with Fig. 1, and the air or gas space of the tank 8 is connected with the chamber 6. After moving the cocks 2 and 3 into the position according to Fig. 3 the pump 1 is set into operation. Pumping is effected for such length of time until the level of the liquid in the view glass remains stationary, or until the liquid rises to the extreme upper edge of the glass 5'. The first of these cases occurs when only the lower half of the tank 8 is filled with liquid, and the liquid in the view glass 5' then indicates by means of the scale 10' the contents of the tank. The second case occurs if the bell end of the pipe 25 is also immersed in the liquid, i. e., when the tank 8 is more than half full. Immediately the level of the liquid in the view glass 5' exceeds the scope of measurement of the scale 10', the cock 24 is adjusted, so that now the pipe 25 is connected with the chamber 6. The pressure created in the chamber 6 by the pumping action then acts on the liquid in the pipe 25 and forces the same, it being greater than the counter-pressure occasioned by the level of the liquid above the lower end of the pipe 25 in the tank 8, towards the bottom. The air will escape in bubbles out of the pipe 25 for such length of time until the air pressure in the chamber 6 and the pipe 25 is equal to the pressure of the liquid situated between the lower end of the pipe 25 and the liquid level in the tank 8. The column of liquid in the view glass 5' adjusts itself in accordance with the variation in pressure in the chamber 6, and the top of the column indicates through the medium of the scale 10" exactly what the contents of the tank are. The scale 10" is so graduated that the same forms a continuation of the scale 10'.

It will be apparent that by the use of the two immersed pipes 9 and 25, of which the one extends to practically half the height of the tank, the view glass 5' need only be half the length as conforms with the diameter of the tank, and that for measuring the contents of the lower half of the tank the scale 10' is employed, and those of the upper half of the tank the scale 10".

It is of course quite possible to provide any additional number of immersed pipes leading to the chamber 6, these pipes dividing the tank into a corresponding number of sections. There will then require to be exactly the same number of scales, and the cock 24 will possess a like number of connections.

The two cocks 2 and 3 may also be united to form one cock with a corresponding number of connections or ways; or in place of the skirt 12 at the upper mouth of the pipe 9 a valve may also be employed, which will control the overflow of the liquid to the pipe 9.

It will be obvious, therefore, that I do not restrict myself to the exact form of embodiment shown, but that various other forms may be devised without departing from the spirit of the invention.

What I claim as new and desire to secure by Letters Patent is:

1. In means for indicating the quantity of liquid in a tank, a liquid carrying tank, indicating means including a view glass and a scale in conjunction therewith, a receptacle having a connection from the bottom thereof with the bottom of the view glass, said receptacle being located intermediate the tank and view glass in an elevation below the view glass and above the tank, a pipe connecting the receptacle with and extended into the liquid in the tank, the connection of said pipe with said receptacle being at a point above the bottom of the receptacle and the liquid in the tank adapted to enter said pipe to the height of the liquid level in the tank with an air space between the liquid therein and the liquid in the receptacle, and means to draw liquid from the tank to the receptacle through the pipe to constitute the indicating liquid and create a pressure upon the liquid in the receptacle and pipe to force the liquid from the pipe and force an equal amount of liquid from the receptacle to the view glass, said liquid in the view glass in conjunction with the scale indicating the quantity of liquid in the tank.

2. In means for indicating the quantity of liquid in a tank, indicating means including a view glass and a plurality of scales juxtaposed thereto, a receptacle having a connection from the bottom thereof with the lower end of the view glass, said receptacle being located below the view glass and above the tank, a valve casing having a connection with the receptacle at a point above the bottom thereof, a pair of pipes connecting the valve casing with and extended into the liquid in the tank and the liquid in the tank adapted to enter said pipes to the height of the liquid level in the tank, a valve in the casing operative to connect either one of said pipes with the receptacle, and means to draw liquid to constitute the indicating liquid from the tank to the receptacle through either of the pipes and create a pressure upon the liquid in the receptacle and the pipe connected therewith to force liquid from the pipe and force an equal amount of liquid from the receptacle into the view glass and in conjunction with the scales indicate the quantity of liquid in the tank.

3. In means for measuring and indicating the quantity of liquid in a tank, a vertical sight glass, a receptacle having a connection from the bottom thereof with the lower end of the sight glass, a tube having a connection with the receptacle at a predetermined point above the bottom and adapted to be extended into the liquid in the tank to be measured, a suction and pressure pump having valve controlled connections on the suction side with the sight glass and receptacle and valve controlled connections on the pressure side with the tank and receptacle, said pump being operative to draw liquid from the sight glass and receptacle and deliver it to the tank, draw liquid from the tank to the receptacle to constitute the indicating medium and apply pressure simultaneously to the liquid in the tube connecting the receptacle with the tank and entered thereinto from the tank and the liquid in the receptacle to displace the liquid in the tube and deliver the liquid from the receptacle into and lift it to a height in the sight glass equal to the displacement of the liquid column in the tube.

4. In means for measuring and indicating the quantity of liquid in a tank, a sight glass extending at an angle to the horizontal, a liquid carrying receptacle having a connection from the bottom thereof with the lower end of the sight glass, tubular means having a connection with and opening to the receptacle above the liquid level therein and adapted to be extended into the liquid in the tank to be measured, a suction and pressure pump having a check valve controlled inlet and a check valve controlled outlet, a valve casing having a connection with the pump inlet, the upper end of the sight glass and the tank, a valve in said casing operative to connect the upper end of the sight glass with the pump inlet and shut off the casing from the tank and shut off the sight glass connection with the pump inlet and connect the same with the tank, a valve casing having connections with the pump outlet, the receptacle and tubular connection means thereof with the tank, and the connection of the first valve casing with the tank, and a valve in said second valve casing operative to connect the pump outlet with the connection means of the first valve casing with the tank and shut off the pump outlet from the receptacle and tubular connection thereof with the tank, and to shut off the outlet of the pump from the connection with the connection of the first valve casing with the tank and connect the pump outlet with the receptacle and its tubular connection means with the tank.

5. In means for measuring and indicating the quantity of liquid in a tank, a sight glass extending at an angle to the horizontal, a liquid carrying receptacle having a connection from the bottom thereof with the lower end of the sight glass, tubular means having a connection with and opening to the receptacle above the liquid level therein and adapted to be extended into the liquid in the tank to be measured, a suction and pressure pump, and valve controlled means for connecting the upper end of the sight glass with the inlet to the pump and the tank and the outlet of the pump with the tank and the air space in the receptacle.

6. In means for measuring and indicating the quantity of liquid in a tank, a sight glass extending at an angle to the horizontal, a liquid carrying receptacle having a connection from the bottom thereof with the lower end of the sight glass, tubular means having a connection with and opening to the receptacle above the liquid level therein and adapted to be extended into the liquid in the tank to be measured, a suction and pressure pump, means to connect the upper end of the sight glass with the pump inlet and the tank including a valve to open said connection means between the sight glass and pump inlet and shut the same off from the tank and shut off said connection means from the pump inlet and open the same to the tank, and means to connect the pump outlet with the air space in the receptacle and the tank including a valve to shut off the pump outlet from the receptacle and open the same to the tank and shut off the pump outlet from the tank and open the same to the receptacle.

7. In means for measuring and indicating the quantity of liquid in a tank, a sight glass arranged at an angle to the horizontal, a receptacle connected from the bottom with the lower end of the sight glass and adapted to contain liquid to constitute the indicating liquid, tubular means opening to the receptacle at a point above the bottom thereof and extended into the liquid in the tank to be measured and receive a column of liquid from the tank equal to the liquid level in the tank and adapted to drain off the liquid from the receptacle to a predetermined level, means to deliver liquid from the receptacle to the tank, and means to draw a fresh supply of liquid from the tank to the receptacle or apply pressure to the liquid in the receptacle and tubular means to displace the liquid column from the tubular means and a proportional displacement of the liquid from the receptacle to the sight glass to effect an indicating of the quantity of liquid in the tank.

In testimony whereof I have affixed my signature.

ARNOLD MOHR.